United States Patent Office 3,485,896
Patented Dec. 23, 1969

3,485,896
PRESSURE SENSITIVE ADHESIVES WITH
IMPROVED WATER RESISTANCE
Lazar Popa, Jr., Sheffield Lake, and Howard K. Lydick,
Lorain, Ohio, assignors to The B. F. Goodrich Company, New York, N.Y., a corporation of New York
No Drawing. Filed Dec. 13, 1967, Ser. No. 690,110
Int. Cl. C08f 37/16; C09j 3/14
U.S. Cl. 260—901
1 Claim

ABSTRACT OF THE DISCLOSURE

Pressure sensitive adhesives based on a terpolymer containing an acrylate monomer and a plurality of acrylamide monomers are improved in water resistance by the addition of a terpolymer of N-t-butyl acrylamide, ethyl acrylate and acrylic acid.

CROSS REFERENCE TO RELATED APPLICATIONS

United States patent application Ser. No. 596,970, filed Nov. 25, 1966.

BACKGROUND OF THE INVENTION

Pressure sensitive adhesives comprising a combination of an acrylate, particularly an 8 carbon atom alkyl acrylate, N-octyl acrylamide, and either acrylamide or methacrylamide have been developed. They comprise 80–96 parts 2-ethylhexyl acrylate, 2.0–19 parts N-octyl acrylamide and 1–4 parts methacrylamide or acrylamide. The sum of the parts of N-octyl acrylamide and methacrylamide or acrylamide must be at least 4. When spread on a carrier tape, they provide a highly tacky, strong pressure sensitive adhesive. While this adhesive maintains its strength very well under dry conditions, it has been found to be somewhat deficient when exposed to moist atmospheres and liquid water. It would be desirable to have these adhesives meet Federal Specification L–T–100a issued by Federal Supply Service, General Services Administration on Aug. 30, 1960.

SUMMARY OF THE INVENTION

It has been discovered that the addition to a pressure sensitive adhesive material comprising an octyl acrylate, N-octyl acrylamide and methacrylamide, of a low molecular weight, alkali soluble acrylic resin terpolymer comprising 20–35% N-t-butyl acrylamide, 60–70% ethyl acrylate and 5–10% acrylic acid has the effect of greatly increasing the resistance of the adhesive to moisture and water immersion.

The carrier tape employed for the pressure sensitive adhesive is about 1 mil thick and is preferably Mylar film, a product of E. I. du Pont de Nemours and Company, a reaction product of ethylene glycol and terephthalic acid cast as a sheet and bilaterally stretched. Other carrier tapes that might be employed include cellophane, kraft paper, cellulose acetate and other known flexible tape backings.

From 1 to 10 parts of the additive resin per 100 parts of terpolymer resin is found to be desirable with 5 to 10 parts preferred. The acrylic resin can be added to the pressure sensitive adhesive terpolymer after the terpolymer has been produced in latex form, or it can be incorporated directly into the terpolymer monomer mixture as the latter is made in the reaction vessel.

DETAILED DESCRIPTION OF THE INVENTION

The preferred pressure sensitive adhesive terpolymer as described in United States patent application Ser. No. 596,970, filed Nov. 25, 1966, is one of 80–96 weight percent 2-ethylhexyl acrylate, 2.0–19 weight percent N-octyl acrylamide and 1–4 weight percent methacrylamide. A charge of water, emulsifier, dispersant, catalyst and monomers is placed in the reactor. Polymerization is run at 70°–85° C. The terpolymer forms a latex product and remains suspended as colloidal size particles until the latex is applied to a carrier tape for use as a pressure sensitive adhesive.

The low molecular weight, alkali soluble acrylic resin additive of this invention is also prepared in a polymerization reactor by charging isopropanol, catalyst and monomers. Polymerization is run for 2½ hours at 120° C. The resin is obtained in a water solution and as such it can be charged with other ingredients for the adhesive terpolymer, or added to the adhesive latex after it is formed.

In the example, parts are parts by weight unless otherwise stated.

EXAMPLE

A batch of pressure sensitive adhesive terpolymer is prepared by charging water, dispersant, emulsifier catalyst and monomers to a 15-gallon polymerization reactor. The reaction is carried out at atmospheric pressure at 80° C. for three hours. The terpolymer forms as a latex.

| Material: | Parts |
|---|---|
| 2-ethylhexyl acrylate | 90.0 |
| N-octyl acrylamide | 8.9 |
| Methacrylamide | 1.1 |
| Water | 100.0 |
| Ammonium nonyl phenol polyether sulfate | 2.5 |
| Ammonium sulfonate of naphthalene-formaldehyde condensate | 1.0 |
| Ammonium persulfate | 0.18 |

In a separate reaction vessel, isopropanol, catalyst and monomers are charged to form the low molecular weight acrylic resin additive.

| Material: | Parts |
|---|---|
| Acrylic acid | 8.00 |
| Ethyl acrylate | 67.00 |
| N-t-butyl acrylamide | 25.00 |
| Isopropanol | 200.00 |
| Tertiary butyl perbenzoate | 1.35 |

The reaction is conducted with agitation in a stainless steel reaction vessel at 35 p.s.i. reaction pressure for 2½ hours at 120° C. Monomers and catalyst are metered into the reactor over a 1½ hour period after reaction starts. The total solids of the solution polymer is 33%.

The isopropanol solvent is stripped off and the polymer is dissolved in an ammonia/water mixture to yield a 45% total solids material.

Blends of the pressure sensitive adhesive and the acrylic resin are prepared on the basis of X parts acrylic resin per 100 parts adhesive solids in the latex. The blends are thoroughly mixed. It is also possible to add the acrylic resin directly to the monomer mixture when forming the adhesive terpolymer latex.

Carrier film, Mylar, 1 mil thick, is coated with the test adhesive latices using a #40 wire wound Meyer rod. The films are dried in air for 12 hours and test specimens 1″ x 10″ are cut and applied to 5″ x 2″ x 0.064″ aluminum alclad plates according to Federal Specification QQ–A–362. The aluminum test panels are first scrubbed with Stoddard solvent, then with methyl alcohol, and the excess solvent is allowed to evaporate prior to a dry wipe with surgical gauze.

The 1″ x 10″ tapes are applied to the aluminum plates by means of a rubber covered roller of the type described by the Pressure Sensitive Tape Council, 1201 Waukegan Road, Glenview, Ill. 60025.

A 5" portion of the tape is adhered to the panel by passing the roll twice over its surface, once in each direction at the rate of 12" per minute and using only the weight of the roller in applying the tape to the panel.

Peel adhesion values are made on the Thwing-Albert Tester at an extension rate of 12 inches per minute. Values obtained while first inch of tape is removed are disregarded. Average values obtained as the next 2 inches of tape are removed are taken as adhesion value.

Intial adhesion values are taken on the tape-panel laminates after 24 hours aging at 72° F., 50% relative humidity.

Similar samples are immersed in distilled water for 24 hours at room temperature. The panels are tested after draining excess water for 15 minutes.

TABLE I

| Test adhesive | Adhesion, ounces per inch | |
|---|---|---|
| | Initial | After 24 hrs. immersion |
| Control (no added resin) | 34 | 4 |
| Control plus 1 part resin | 34 | 22 |
| Control plus 2.5 parts resin | 34 | 19 |
| Control plus 5.0 parts resin | 24 | 26 |
| Control plus 10.0 parts resin | 29 | 30 |

Similar test tapes are prepared and tested using three commercial pressure sensitive adhesives.

Adhesive A is an acrylic containing emulsion that analyzes 90% vinyl acetate, 10% butyl acrylate.

Adhesive B is a vinyl acetate copolymer emulsion that analyzes 50% 2-ethylhexyl acrylate, 50% vinyl acetate.

Adhesive C is an acrylic copolymer emulsion that analyzes 60% 2-ethylhexyl acrytate, 40% ethyl acrylate.

TABLE II

| Test adhesive | Adhesion, oz. per inch | |
|---|---|---|
| | Initial | After 24 hrs. immersion |
| Adhesive A | 112→0 | 0 |
| Adhesive B | 74→0 | 0 |
| Adhesive C | 80→29 | 2 |

Under initial adhesion, the first value is the force needed to start the stripping action; the second value is the force needed to maintain it. Adhesives A and B are considered to be relatively poor pressure sensitive adhesives because of the low second value. The adhesive of this invention does not lose strength as it is peeled off the test piece.

The data show that addition of the acrylic resin has preserved the initial level of peel strength through a 24-hour water immersion. This improved adhesive will stand up well, as a packing sealer, for instance, where objects are exposed to high humidity, heavy rains, or even flood conditions.

We claim:

1. A pressure sensitive adhesive composition comprising the polymerized terpolymer combination of 80–96 parts 2-ethylhexyl acrylate, 2.0–19 parts N-octyl acrylamide and 1–4 parts of a material selected from the group consisting of acrylamide and methacrylamide, the sum of the parts of N-octyl acrylamide and methacrylamide or acrylamide being at least equal to 4, and from 1–10 parts per 100 parts of solids of said terpolymer of an acrylic terpolymer resin comprising 30–40 weight percent t-butyl acrylamide, 55–65 weight percent ethyl acrylate and 5–15 weight percent acrylic acid.

References Cited

UNITED STATES PATENTS 3,271,479  10/1966  Vogel et al. _____ 260—901

MURRAY TILLMAN, Primary Examiner

C. J. SECCURO, Assistant Examiner

U.S. Cl. X.R.

156—331; 161—256, 167; 260—80.73

PO-1050
(5/69)

UNITED STATES PATENT OFFICE
CERTIFICATE OF CORRECTION

Patent No. 3485896      Dated December 23, 1969

Inventor(s) LAZAR POPA, JR. AND HOWARD K. LYDICK

It is certified that error appears in the above-identified patent and that said Letters Patent are hereby corrected as shown below:

Column 1, line 26, before "acrylate", insert --alkyl--.
Column 3, line 45, for "acrytate" read --acrylate--.

SIGNED AND
SEALED
JUL 21 1970

SEAL)
Attest:

Edward M. Fletcher, Jr.
Attesting Officer

WILLIAM E. SCHUYLER, JR.
Commissioner of Patents